(12) United States Patent
ElWazeer et al.

(10) Patent No.: US 11,032,342 B2
(45) Date of Patent: Jun. 8, 2021

(54) SYSTEM AND METHOD FOR DEVICE AUDIO

(71) Applicant: Samsung Electronics Co., Ltd., Suwon-si (KR)

(72) Inventors: Khaled ElWazeer, Santa Clara, CA (US); Ivan Getta, Mountain View, CA (US); Myungsu Cha, Suwon-si (KR); Ahmed M. Azab, Palo Alto, CA (US); Rohan Bhutkar, San Jose, CA (US); Guruprasad Ganesh, Santa Clara, CA (US); Wenbo Shen, Sunnyvale, CA (US); Ruowen Wang, San Jose, CA (US); Junyong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 16/503,230

(22) Filed: Jul. 3, 2019

(65) Prior Publication Data

US 2020/0014741 A1    Jan. 9, 2020

Related U.S. Application Data

(60) Provisional application No. 62/694,314, filed on Jul. 5, 2018, provisional application No. 62/694,383, filed on Jul. 5, 2018.

(51) Int. Cl.
*H04L 29/06* (2006.01)
*G06F 9/38* (2018.01)
*G06F 9/48* (2006.01)
*G06F 9/54* (2006.01)

(52) U.S. Cl.
CPC .............. *H04L 65/601* (2013.01); *G06F 9/38* (2013.01); *G06F 9/4843* (2013.01); *G06F 9/544* (2013.01)

(58) Field of Classification Search
CPC .......... G06F 9/38; G06F 9/4843; G06F 9/544; H04L 65/601
See application file for complete search history.

(56) References Cited

U.S. PATENT DOCUMENTS

| | | |
|---|---|---|
| 9,245,144 B2 | 1/2016 | Li et al. |
| 9,338,522 B2 | 5/2016 | Rajgopal et al. |
| 9,355,253 B2 | 5/2016 | Kellerman et al. |

(Continued)

FOREIGN PATENT DOCUMENTS

| | | |
|---|---|---|
| EP | 3340057 A1 | 6/2018 |
| WO | WO 2016/048404 A1 | 3/2016 |

OTHER PUBLICATIONS

ISA/KR, International Search Report and Written Opinion of the International Searching Authority, International Application No. PCT/KR2019/008327, dated Oct. 16, 2019, 8 pages.

*Primary Examiner* — Zachary K Huson

(57) ABSTRACT

This disclosure relates to an electronic device including a memory and at least one processor coupled to the memory. The at least one processor is configured to execute a daemon process in one of a container or a host operating system, wherein the daemon process is configured to manage data transfer between the container and the host operating system, create, via the daemon process, an inter-process communication (IPC) channel between the container and the host operating system, receive incoming audio data, and buffer the incoming audio data to the IPC channel.

20 Claims, 7 Drawing Sheets

(56) References Cited

U.S. PATENT DOCUMENTS

| | | | |
|---|---|---|---|
| 9,705,890 B2 | 7/2017 | Chen | |
| 2008/0186960 A1* | 8/2008 | Kocheisen | G06F 9/50 370/359 |
| 2009/0228897 A1 | 9/2009 | Murray et al. | |
| 2013/0055293 A1 | 2/2013 | Srinivasan et al. | |
| 2015/0150025 A1 | 5/2015 | Yuen et al. | |
| 2015/0347177 A1 | 12/2015 | Magee et al. | |
| 2018/0007162 A1* | 1/2018 | Olmsted-Thompson | H04L 67/2861 |
| 2018/0210801 A1 | 7/2018 | Wu et al. | |
| 2018/0349175 A1* | 12/2018 | Andrus | G06F 9/4893 |

\* cited by examiner

SYSTEM AND METHOD FOR DEVICE AUDIO

CROSS-REFERENCE TO RELATED APPLICATION AND CLAIM OF PRIORITY

This application claims priority under 35 U.S.C. § 119(e) to U.S. Provisional Patent Application No. 62/694,314, filed on Jul. 5, 2018, and entitled "System and Method for Audio Playback." This application also claims priority under 35 U.S.C. § 119(e) to U.S. Provisional Patent Application No. 62/694,383, filed on Jul. 5, 2018, and entitled "System and Method for Audio Recording." Provisional Patent Application Nos. 62/694,314 and 62/694,383 are hereby incorporated by reference in their entirety.

TECHNICAL FIELD

This disclosure relates generally to implementing guest environments on a computing platform. More specifically, this disclosure relates to a system and method for device audio.

BACKGROUND

Applications are often dependent on specific libraries, dependencies, and files, and thus are not always portable to different systems that do not contain the specific libraries, dependencies, and files for the application to run properly. Containers provide a set of one or more processes that are isolated from the rest of a system. All the files necessary to run containers are provided from a distinct image, meaning that containers are portable and consistent between different systems. The contents of a container can also be considered an installation of an operating system because the container comes complete with application installation packages, configuration files, and other components for running an operating system. Containers therefore allow for running multiple, isolated, operating systems on a single system.

Containers can share the same operating system kernel and isolate the application processes from the rest of the system. Containers revolutionize how applications are developed, deployed, and managed, and provide portability and version control, helping to ensure that an application that works during development also works for end users. Compared to virtual machines, containers are less resource intensive, have a standard interface (start, stop, environment variables, etc.), retain application isolation, and are more easily managed as part of a larger application (multiple containers).

In existing situations where container applications provide audio playback, device nodes of the kernel audio drivers are exposed to the container. Solutions are therefore needed for secure audio playback.

SUMMARY

This disclosure provides a system and method for device audio.

In a first embodiment, an electronic device includes a memory and at least one processor coupled to the memory. The at least one processor is configured to execute a daemon process in one of a container or a host operating system, wherein the daemon process is configured to manage data transfer between the container and the host operating system. The at least one processor is further configured to create, via the daemon process, an inter-process communication (IPC) channel between the container and the host operating system. The at least one processor is further configured to receive incoming audio data. The at least one processor is further configured to buffer the incoming audio data to the IPC channel.

In a second embodiment, a method for device audio includes executing a daemon process in one of a container or a host operating system, wherein the daemon process manages data transfer between the container and the host operating system. The method further includes creating, via the daemon process, an inter-process communication (IPC) channel between the container and the host operating system. The method further includes receiving incoming audio data. The method further includes buffering the incoming audio data to the IPC channel.

In a third embodiment, a non-transitory computer readable medium embodies a computer program for operating an electronic device including a memory and at least one processor. The computer program includes computer readable instructions that, when executed by the at least one processor, cause the electronic device to execute a daemon process in one of a container or a host operating system, wherein the daemon process manages data transfer between the container and the host operating system. The computer program further includes computer readable instructions that, when executed by the at least one processor, cause the electronic device to create, via the daemon process, an inter-process communication (IPC) channel between the container and the host operating system. The computer program further includes computer readable instructions that, when executed by the at least one processor, cause the electronic device to receive incoming audio data. The computer program further includes computer readable instructions that, when executed by the at least one processor, cause the electronic device to buffer the incoming audio data to the IPC channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HIVID), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 7, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure.

Figure 1:
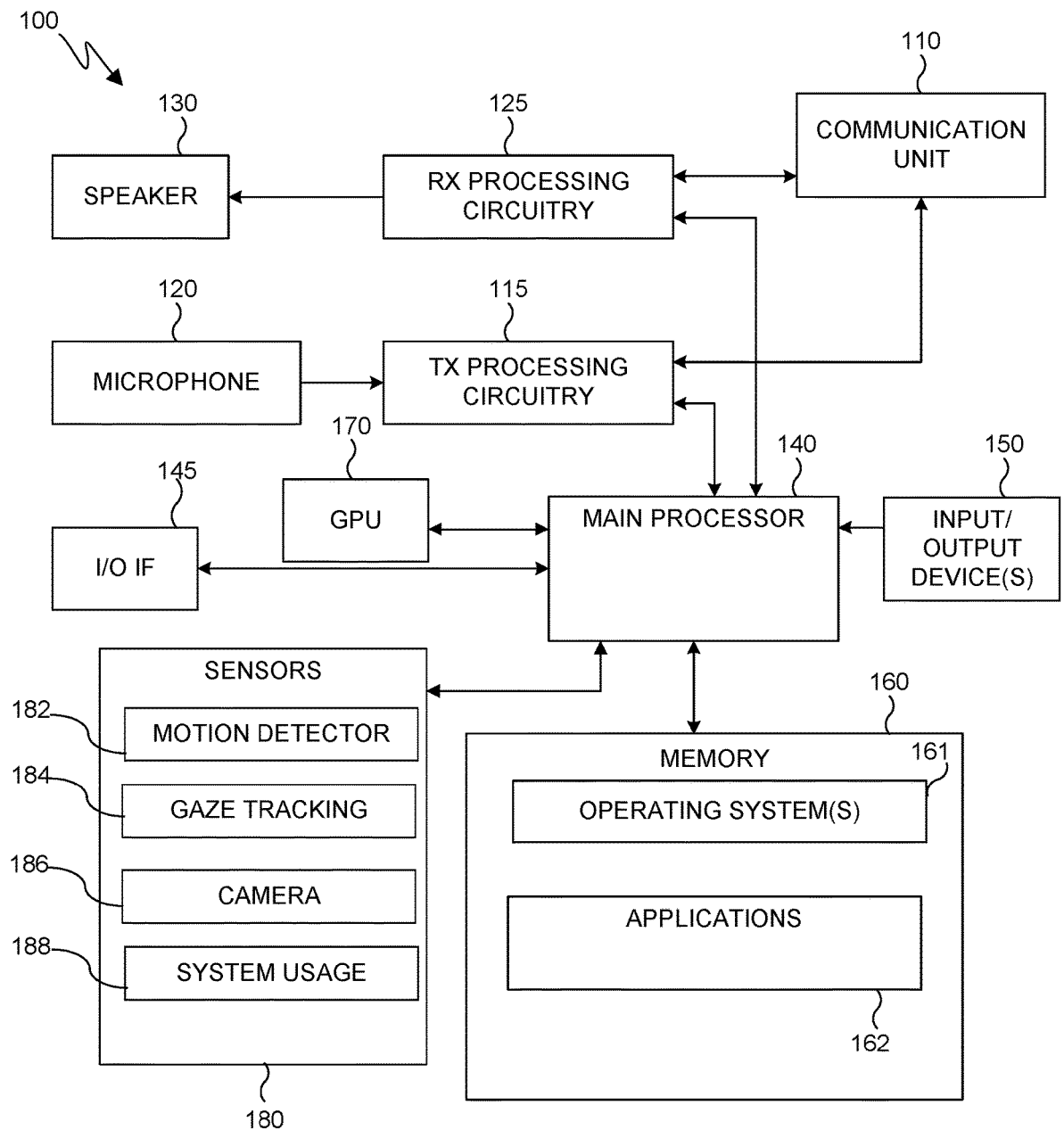
FIG. 1 illustrates an example of a device for providing data between a guest and a host environment according to embodiments of this disclosure.

FIG. 1 illustrates an example of a device 100 for providing data between a guest and a host environment according to embodiments of this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in FIG. 1, the device 100 includes a communication unit 110 that may include, for example, a radio frequency (RF) transceiver, a Bluetooth® transceiver, or a Wi-Fi® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes a plurality of operating system (OS) programs 161 and one or more applications 162. According to certain embodiments, plurality of OS programs 161 includes a host, or default operating system, as well as one or more guest operating systems which can be implemented on one or more containers provided by device 100.

Applications 162 can include legacy applications, or applications developed for, and having application logic tied to host or guest operating system programs on device 100. Applications 162 can output audio data for playback using an audio output device connected to the device 100, such as speaker 130. Applications 162 can also receive audio input data for from an audio input device connected to the device 100, such as microphone 120.

The communication unit 110 may receive an incoming RF signal such as a Bluetooth® or Wi-Fi® signal. The communication unit 110 may down-convert the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, and/or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the basic OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user, sensors 180 or applications 162. Applications 162 can include applications specifically developed for the platform of device 100, or legacy applications developed for earlier platforms. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device. Input/output device(s) 150 are, according to certain embodiments, associated with one or more of sensor(s) 180 to provide input to main processor 140.

Input/output device(s) 150 can include one or more screens, which can be a liquid crystal display, light-emitting diode (LED) display, an optical LED (OLED), an active matrix OLED (AMOLED), or other screens capable of rendering graphics. The one or more screens can include a plurality of display elements, such as electronically modulated light emitting diodes, that define a physical, or native resolution of a screen comprising input/output device(s) 150. For example, a WQHD display can have a physical resolution of 2560×1440 pixels. Additionally, screens can include a touchscreen capable of registering tactile inputs correlating with pixels of the screen and/or regions of the screen.

The main processor 140 can be configured to perform operations according to control logic provided by basic operating system 161, applications 162 and/or other executable program code stored in memory 160. The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

Sensors 180 can comprise a variety of sensors for generating inputs processed by device 100, and include without limitation, accelerometers, digital cameras, touch sensors, digital thermometers, pressure sensors and global positioning system sensors. For example, sensors 180 can include a motion detector 182. Motion detector 182 can be an optical sensor, an accelerometer or a gyroscopic sensor. Additionally, motion detector 182 can comprise multiple motion detectors, such as motion detectors coupled to a user's head and/or limbs. Additionally, sensors 184 may include cameras and other sensors 184 suitable for performing gaze tracking of a user's eyes, to detect which portions of the screen a user's gaze is focused upon. Sensors 180 can include additional cameras 186, including cameras disposed on the back side of screen, including sensors for providing an augmented reality (AR) experience, in which digital images are superimposed over the view of a camera positioned on or near a user's eye. Further, sensors 180 can include sensors 188 configured to monitor the usage of system resources, including, without limitation, main processor 140, GPU 170 and/or memory 160.

Although FIG. 1 illustrates one example of a device 100 for providing data between a guest and a host environment according to embodiments of this disclosure, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
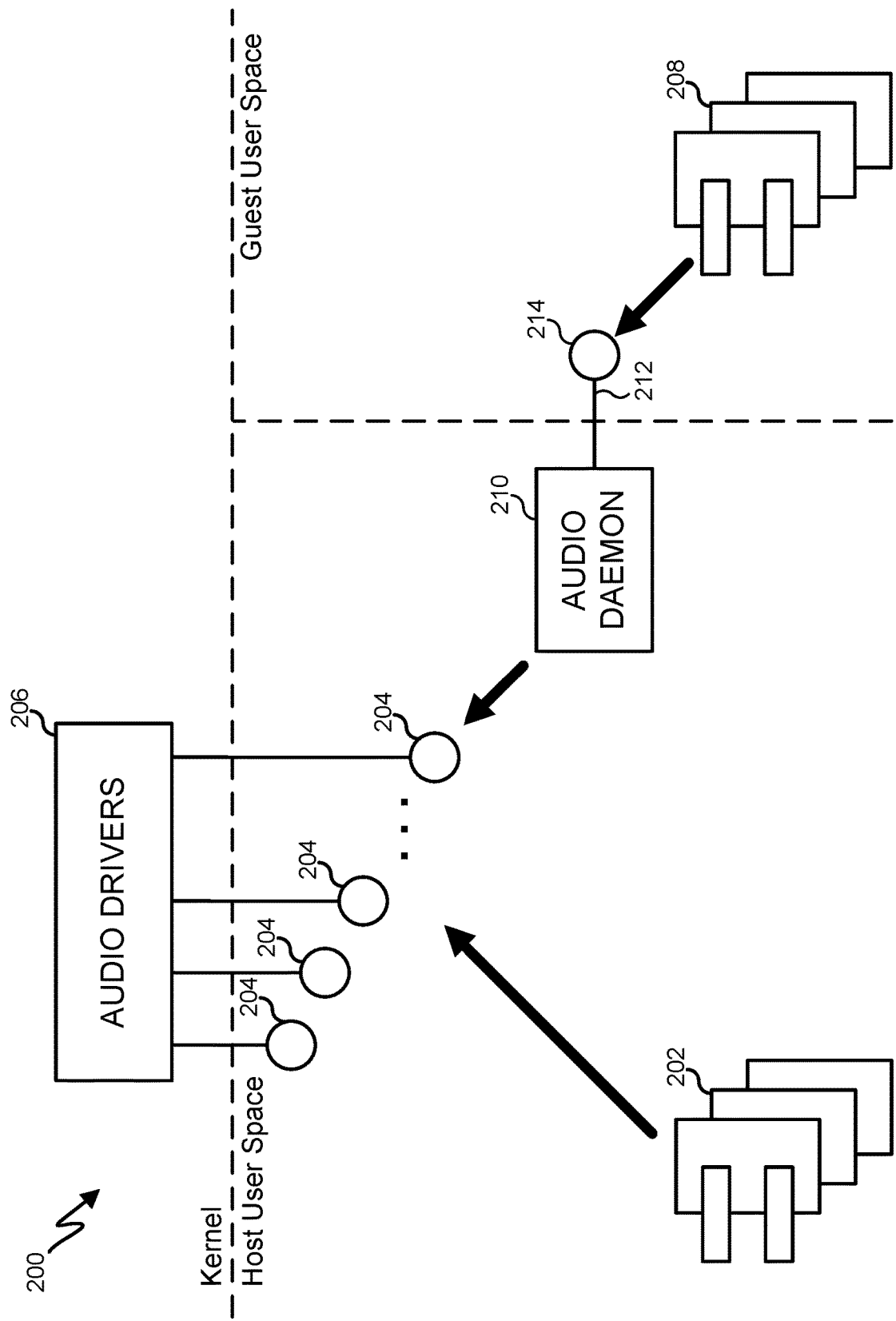
FIG. 2 illustrates an example operating environment for providing device audio between a container and a host operating system according to embodiments of this disclosure.

FIG. 2 illustrates an example operating environment 200 for providing device audio between a container and a host operating system according to embodiments of this disclosure. The environment 200 and the components of the environment 200 can be executed on a device, such as device 100, and/or by a processor, such as processor 140. The environment 200 includes a host user space wherein one or more applications 202 are executed. To provide audio output, the applications 202 access one or more device nodes 204 linked to audio drivers 206 in a kernel of the host operating system. The device nodes 204 can be various device nodes used for processing audio output from the applications 202 provided by audio architectures such as Advanced Linux Sound Architecture (ALSA). The device nodes 204 can be accessible via file system paths such as /dev/snd/pcm, /dev/snd/controlC0, /dev/snd/seq, /dev/snd/timer, or other device node paths. Device nodes can be secured by discretionary access control (DAC) to prevent unauthorized access to device nodes.

The environment 200 further includes a guest user space that can be operated in conjunction with the host user space. The guest user space is within a container that includes one or more container applications 208. The container can include libraries, dependencies, files, and other components that allow for the one or more container applications 208 to run independently from the host user space, such that the guest user space provides a separate and distinct operating space from the host user space. The container can further include components such as program installation packages, such as Red Hat Package (RPM) files, configuration files, and other components for running a guest operating system in the guest user space. The host operating system and the guest operating system can run concurrently in the environment 200, to provide programs and other functionality of multiple operating systems to a device such as device 100. Example host and guest operating systems can include various Linux distributions, various versions of MICROSOFT WINDOWS, various versions of OSX, various mobile device-based operating systems such as iOS and ANDROID, and other operating systems. In some embodiments, the host user space and the guest user space may be based on the same OS, with the two user spaces providing isolated or "jailed" instances of the operating system. In some embodiments, more than one guest operating system and guest operating space can be executed in the environment 200. In some embodiments, one or more applications in the host user space can execute and manage the container, and system resources can be allocated by the kernel to the one or more applications that execute and manage the container in order to distribute resources between the container and applications and processes running in the host user space. The environment 200 can be used in the context of a single instance of the kernel and multiple instance of user spaces, and is not bound to a specific kernel or specific host or guest system. The environment 200 can be applied to a broad spectrum of computing systems.

The environment 200 further includes an audio daemon 210. The audio daemon 210 can be executed in either the guest user space, or the host user space as illustrated in the example in FIG. 2. In embodiments in which the audio daemon 210 is executed in the guest user space, a host user space application can be executed to communicate with the audio daemon 210 on the guest user side over the IPC channel 212. The audio daemon 210 provides an inter-process communication (IPC) channel 212 between the host user space and the guest user space. In some embodiments, the IPC channel 212 can include at least one socket 214 to maintain the IPC channel 212 between the host user space and the guest user space. The socket 214 can be a local socket or a network socket. The socket 214 can be labeled with a path, such as /audio0, for the container applications 208 to access the socket. In some embodiments, the IPC channel 212 can also be associated with a buffer for storing data in a shared memory space. The IPC channel 212 allows for data such as audio data to be communicated from the inside of the container to the outer host operating system, or from the outer host operating system to the inside of the container. The container applications 208 can, using the IPC channel 212, pass audio handles and messages through the IPC channel 212, and write audio data to the shared memory space. The audio daemon 210 receives the handles and messages and reads the shared memory space to access the audio data from the container applications 208. The audio daemon can then access the device nodes 204 to output audio provided by the container applications 208 to an audio output device, such as the built-in speakers of the device executing the host and guest operating spaces, or external audio output devices connected to the device, such as external hard-wired speakers, BLUETOOTH speakers, or other devices. The audio daemon 210 can also receive audio input data provided on the host user space and pass the audio input data over the IPC channel 212 to the container applications 208, to provide audio input data, such as microphone input, to the container applications 208.

The IPC channel 212 prevents container applications from directly accessing the device nodes 204 in the host user space. Existing solutions for enabling audio playback for containers are based on the exposure of the device nodes to the kernel audio drivers. These existing solutions can pose security risks because direct access to the device nodes in the host user space can grant access to the kernel's drivers to the separate operating system in the guest user space, enabling container applications to manipulate host operating system processes and resources. The IPC channel 212 provides a secure and efficient way to provide audio playback without exposing a device driver's privileged /dev nodes to the container.

The IPC channel 212 can be secured by kernel security protocols such as Security-Enhanced Linux (SELinux), Security-Enhanced Android (SEAndroid), or other protocols. The security protocols can secure the IPC channel 212 by using both DAC and mandatory access control (MAC) to prevent access to the socket 214 by the container applications 208. MAC provides a strict level of control that takes a hierarchical approach to controlling access to resources. Under a MAC enforced environment, access to all resource objects (such as data files) is controlled by settings defined by the system administrator. As such, all access to resource objects is strictly controlled by the operating system based on system administrator configured settings. Under MAC enforcement, users cannot change the access control of a resource. Each user account on a system also has classification and category properties from the same set of properties applied to the resource objects. When a user attempts to access a resource under MAC, the operating system checks the user's classification and categories and compares them to the properties of the object's security label. If the user's credentials match the MAC security label properties of the object access, is allowed.

Using the shared memory between the audio daemon 210 and the container applications 208 provides for efficient communication of data between the host user space and the guest user space. Passing the audio data through the shared memory avoids spending power, computational power, and resources on read-write cycles or memcpy operations. In some embodiments, the IPC channel 212 can be implemented without shared memory. In some embodiments, the IPC channel 212 can be implemented with shared memory, but without the socket 214. In embodiments that do not use the socket 214, separate shared memory buffers can be used, at least one to buffer audio data, and at least another to buffer control communications such as handles and messages that indicate how to use the audio data to the host user space.

Although FIG. 2 illustrates one example of an environment 200 for providing device audio between a container and a host operating system according to embodiments of this disclosure, various changes may be made to the example of FIG. 2. For example, the environment 200 could include any number of components in any suitable arrangement. In general, operating environments come in a wide variety of configurations, and FIG. 2 does not limit the scope of this disclosure to any particular configuration. While FIG. 2 illustrates one operational environment in which various features disclosed in this patent document can be used, these features could be used in any other suitable system.

For example, the IPC channel 212 can include a local socket, a network socket and/or shared memory. The IPC channel 212, in some embodiments, can be created when a container starts. In some embodiments, the IPC channel 212 can be created on demand whenever a guest application tries to use or output audio, which can provide for increased power efficiency and resource efficiency. In some embodiments, the IPC channel 212 is connected and runs after creation so long as the container continues running. In some embodiments, the IPC channel 212 is terminated when no audio is available or is being output from the container applications 208, which can provide for increased power efficiency and resource efficiency. In some embodiments, the IPC channel 212 is controlled by an application on both the host and the guest user spaces, such as if audio data is being passed out of and into the container, such as when an application in the container is both outputting audio data and receiving audio input data from a microphone. In some embodiments, the audio daemon 210 operates at a decreased functionality and waits for audio data to be received to save power and computational resources. In some embodiments, the audio daemon 210 creates a separate thread to process audio content, and another thread to process handles and messages over the IPC channel 212.

Figure 3:
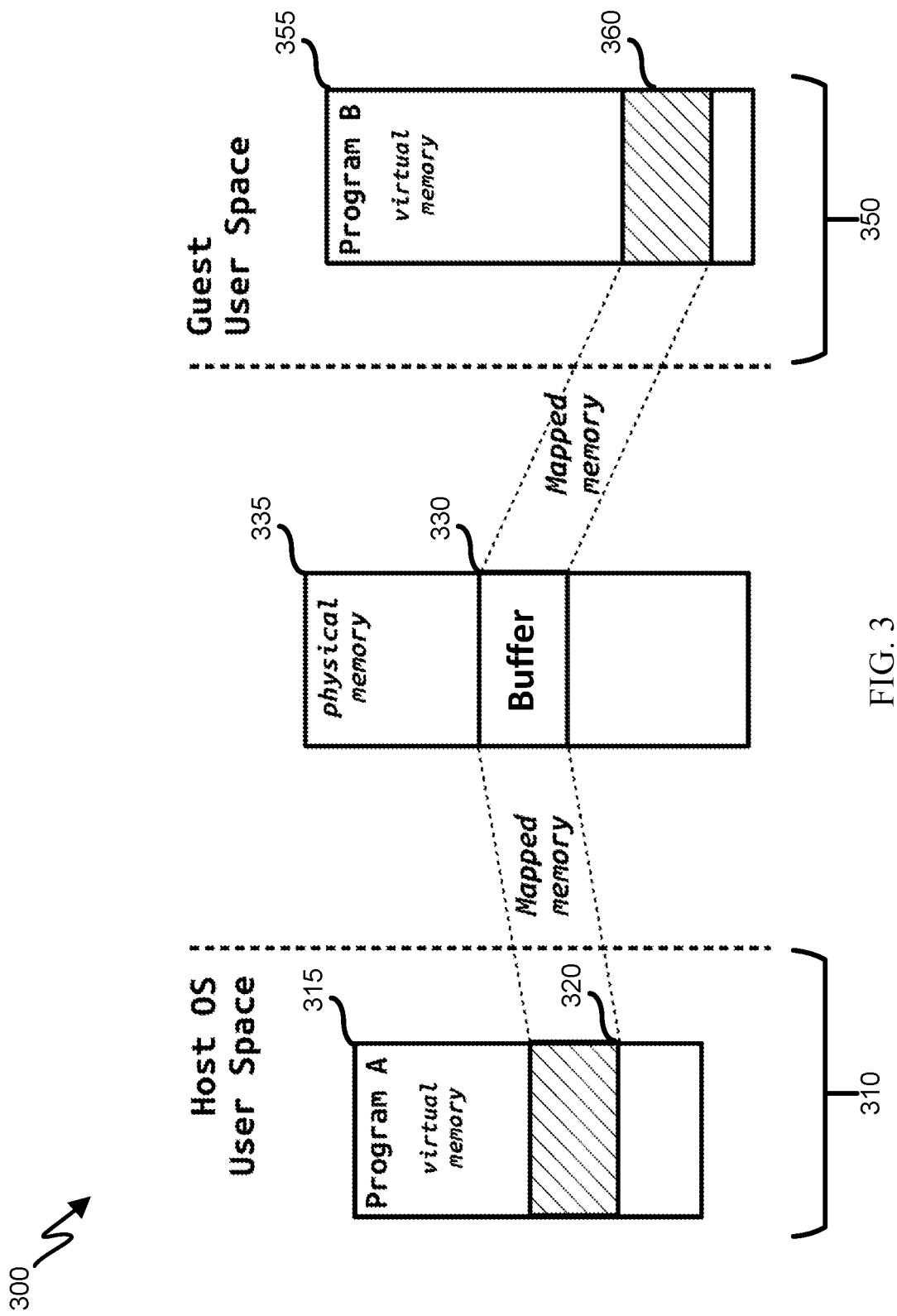
FIG. 3 illustrates an example of delivering data from a guest environment to a host environment according to embodiments of this disclosure.

FIG. 3 illustrates an example 300 of delivering data from a guest environment to a host environment according to embodiments of this disclosure. The example 300 can be executed on a device, such as device 100, and/or by a processor, such as processor 140.

Referring to the non-limiting example of FIG. 3, a device operating a host OS implements a host user space 310, and a container providing a guest user space 350. According to certain embodiments, the host user space 310 and the guest user space 350 are based on different operating systems (for example, the host user space 310 can run the Android OS, while the guest user space 350 can run WINDOWS). In some embodiments, the host user space 310 and the guest user space 350 may be based on the same OS, with the two user spaces providing isolated or "jailed" instances of the operating system.

According to certain embodiments, programs running in the host user space 310 include one or more programs 315 responsible for implementing a shared memory buffer 330 in the physical memory 335 of a device, such as device 100. In some embodiments, programs running in the guest user space 350 include one or more programs 355 which pass data from within the guest user space 350 to the host user space 310 for use by processes of the host user space 310, such as passing audio data from the container application 355, for output by audio output devices accessible to the guest user space 350. The programs 355 in the guest user space 350 or the programs 315 in the host user space can include at least one daemon process for handling the communication of the data between the host user space 310 and the guest user space 350. In embodiments in which the daemon is executed in the guest user space, the applications 315 of the host user space can include at least one application that executes and manages a container that holds the guest user space 350 and components used to run the operating system of the guest user space 350.

In some embodiments, the daemon process or program 315 in the host user space 310, as part of setting up an IPC channel for communication between the host user space 310 and the guest user space 350, allocates a portion of physical memory 335 as the memory buffer 330. As a program in the host user space and implementing the host OS of the device, the program 315 may be better positioned to ensure that the memory buffer 330 is allocated in a way that is fully compliant with, for example, audio input and output hardware of the underlying device. As an application operating in the host user space, the program 315 is, in certain embodiments, able to access information regarding details of the physical memory 335 (for example, start address alignment, stride of an array, and whether an array is contiguous in physical memory), which may not be available to applications running in the guest user space 350. This information can be useful for allocating the memory buffer 330 in a way that attempts to optimize the performance of the memory buffer 330. In some embodiments, the daemon process or application 355 can allocate the physical memory to be used for the memory buffer 330, as part of setting up an IPC channel for communication between the host user space 310 and the guest user space 350.

According to certain embodiments, and depending on which of the host user space 310 and the guest user space 350 executes the process, such as the daemon process, for implementing the IPC channel, after allocating a portion of the physical memory 335 as a memory buffer, the program 315 or the program 355 maps the allocated memory buffer into its virtual address space, thereby allowing the program 315 or the program 355 to access data in the memory buffer 330 without a memory copy.

In some embodiments, the program 315 or the program 355 then passes a handle to the allocated memory buffer 330 and the other one of the program 315 or the program 355 running in the other user space. According to some embodiments, a handle may be provided in the form of a file descriptor. In the non-limiting example of FIG. 3, the program 315 or the program 355 that received the handle, uses the handle (or address information provided with the handle) to map the buffer 330 into its own virtual address space. With the virtual address space of both the program 315 and the program 355 both mapping to the same region of the physical memory 335 used as the memory buffer 330, data is immediately available to processes in the host user space 310 and the guest user space 350. In some embodiments, the program 315 and/or the program 355 reports to the other one of the program 315 or the program 355 each time the memory buffer 330 is updated. Additionally, according to certain embodiments, the program 315 passes data obtained from the memory buffer 330 to one or more processes that use the data, such as processes for outputting audio data. According to certain embodiments, the program 355 passes data obtained from the memory buffer 330 to one or more container processes requesting data from the host user space, such as audio input data.

Figure 4:
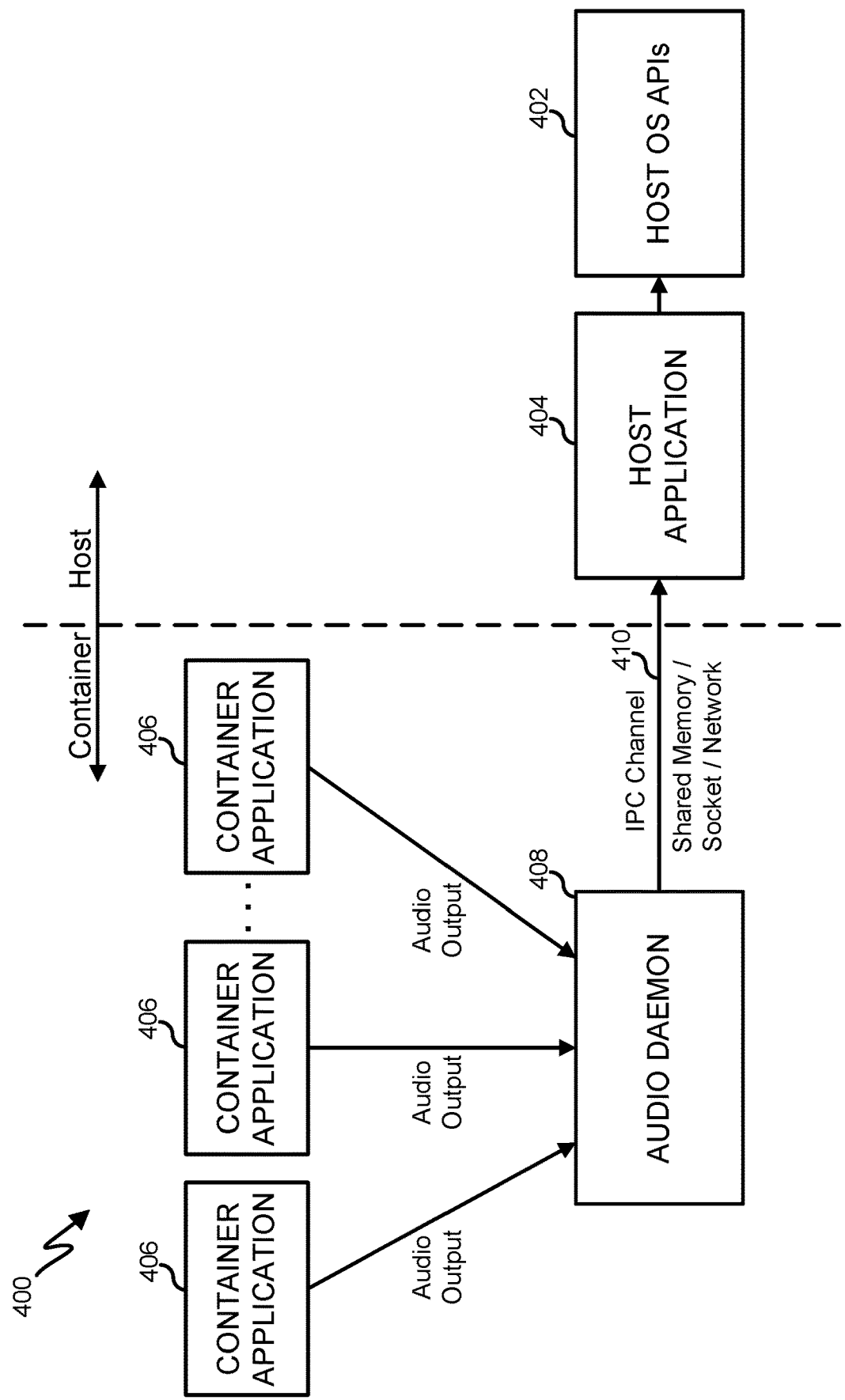
FIG. 4 illustrates an example operating environment for providing audio output from a container to a host operating system according to embodiments of this disclosure.

FIG. 4 illustrates an example operating environment 400 for providing audio output from a container to a host operating system according to embodiments of this disclosure. The environment 400 and the components of the environment 400 can be executed on a device, such as device 100, and/or by a processor, such as processor 140. The environment 400 includes a container user space or name space and a host user space or name space. The host user space includes a host operating system managed by a kernel for playback of audio through one or more audio output devices. A host application 404 in the host user space executes and manages the container, and uses host operating system APIs 402 to provide data to the host operating system, such as audio data received from the container for playback using audio drivers in the kernel of the host operating system. The host operating system and the container or guest operating system can be various operating systems, such as various distributions of the Linux OS, ANDROID OS, WINDOWS OS, or other operating systems. A kernel for managing the operating systems of the host operating system and the container operating system can be a Linux kernel, or another type of operating system kernel. The environment 400 can be used in the context of a single instance of the kernel and multiple instance of user spaces, and is not bound to a specific kernel or specific host or guest system. In some embodiments, there can be multiple containers executed concurrently. The environment 400 can be applied to a broad spectrum of computing systems.

The container user space includes one or more container applications 406. As illustrated in FIG. 4, the container user space also includes an audio daemon 408. The audio daemon 408 is an asynchronous dedicated process or thread inside the container that collects audio data from the guest system output by the one or more container applications 406. The audio daemon 408 creates an IPC channel 410 to transfer the audio data from within the container to the host user space. The IPC channel 410 can be secured by kernel security protocols such as SELinux, SEAndroid, or other protocols. The IPC channel 410 can be secured by both DAC and MAC to prevent unauthorized access to the IPC channel 410 by other entities such as the container applications 406. The audio daemon 408 is given special permissions to access the secured IPC channel 410.

The audio daemon 408 further establishes a socket, such as a local socket or a network socket, and a shared memory buffer between the audio daemon 408 and the host application 404 in the host user space. As audio outputs from the one or more container applications 406 are received by the audio daemon 408, the audio daemon 408 buffers the audio data into the IPC channel 410. In some embodiments, the audio daemon 408 buffers audio content into the shared memory buffer, and transfers handles and messages indicating how to use the audio content over the IPC channel 410 via the socket. For example, the handles and messages can include data such as audio configuration settings, such as sampling rate, audio format, information for particular client applications, or other settings. In some embodiments, the IPC channel 410 can be implemented without shared memory. In some embodiments, all audio data can be implemented with shared memory, without using a socket. In embodiments that do not use a socket, separate shared memory buffers can be used, at least one to buffer audio data, and at least another to buffer control communications such as handles and messages that indicate how to retrieve and use the audio content to the host user space.

The host application 404, in response to the handles and messages sent over the IPC channel 410 from the audio daemon 408, buffers incoming audio in the shared memory into tracks for playback. In some embodiments, the host application 404 can have extra permissions assigned to the host application 404 that allow the host application 404 to read socket data and/or shared memory. The extra permissions can be initially configured as part of the host application 404, or can be granted to the host application 404, such as by a user indicating that access to device resources, such as audio, is allowed. The host application 404 can then access device nodes or other components of the host operating system to provide the audio tracks for playback through at least one audio output device connected to a device running the environment 400. Providing the audio content through the shared memory buffer provides for efficient use of computing resources and power consumption, as data in shared memory is readily accessible to applications with access to the shared memory. The secured IPC channel 410 also provides for enhanced security, as host applications in the host user space, such as host application 404, retrieve audio data and access the device nodes of the host operating system for playback of the audio data, while container applications merely provide the audio data without being able to access the device nodes of the host operating system.

Although FIG. 4 illustrates one example of an environment 400 for providing audio output from a container to a host operating system according to embodiments of this disclosure, various changes may be made to the example of FIG. 4. For example, the environment 400 could include any number of components in any suitable arrangement. In general, operating environments come in a wide variety of configurations, and FIG. 4 does not limit the scope of this disclosure to any particular configuration. While FIG. 4 illustrates one operational environment in which various features disclosed in this patent document can be used, these features could be used in any other suitable system.

For example, the IPC channel 410 can include a local socket, a network socket and/or shared memory. The IPC channel 410, in some embodiments, can be created when a container starts. In some embodiments, the IPC channel 410 can be created on demand whenever a guest application tries to use or output audio, which can provide for increased power and resource efficiency. In some embodiments, the IPC channel 410 is connected and runs after creation so long as the container continues running. In some embodiments, the IPC channel 410 is terminated when no audio is available or is being output from the container applications 406, which can provide for increased power and resource efficiency. In some embodiments, the IPC channel 410 is controlled by an application on both the host and the guest user spaces, such as if audio data is being passed out of and into the container, such as when an application in the container is both outputting audio data and receiving audio input data from a microphone. In some embodiments, the host application 404 operates at a decreased functionality and waits for an audio channel to be created to save power and computational resources. In some embodiments, the audio daemon 408 creates a separate thread to process audio content, and another thread to process handles and messages over the IPC channel 410.

Figure 5:
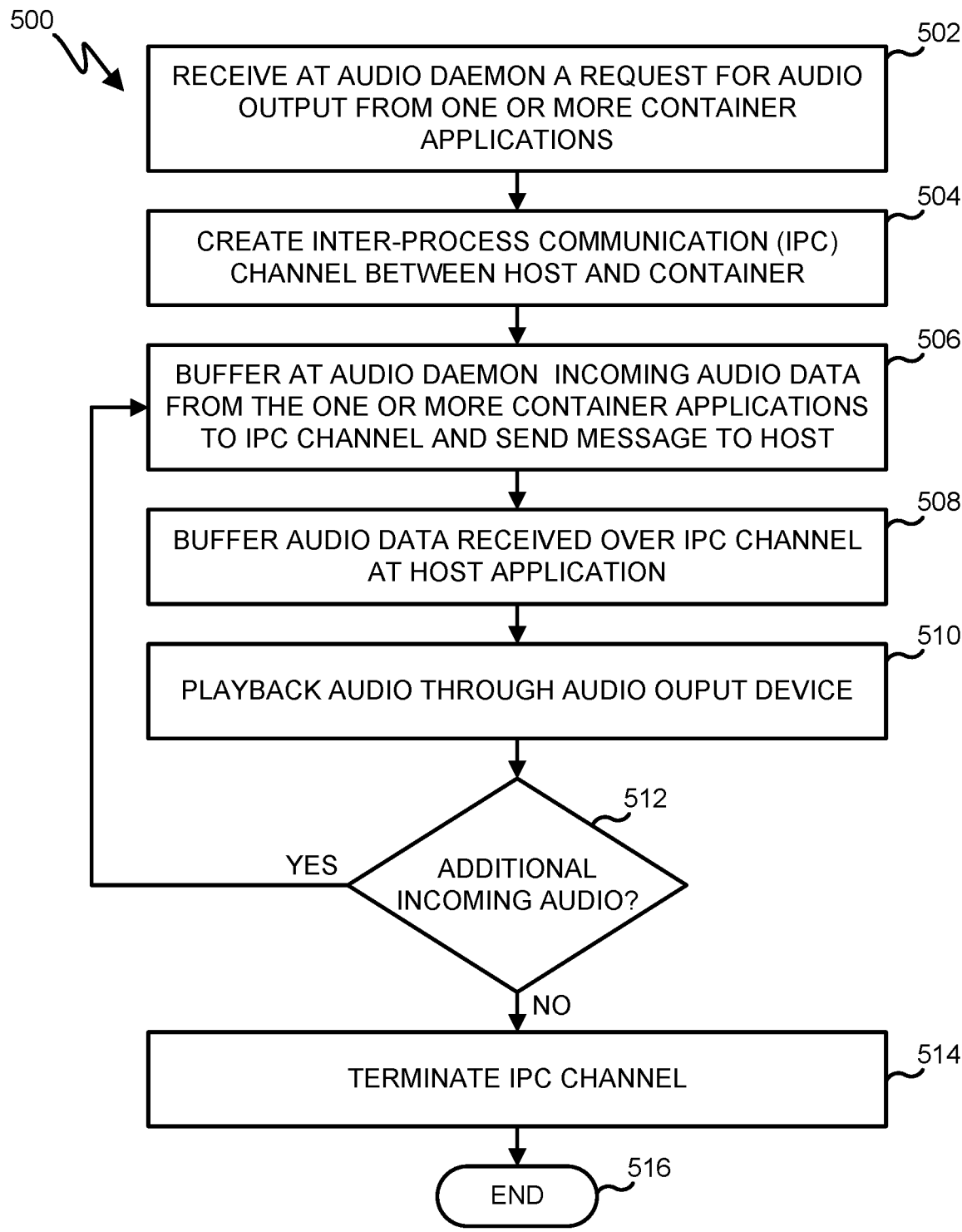
FIG. 5 illustrates a process for providing audio playback from a guest user space to a host user space according to embodiments of this disclosure.

FIG. 5 illustrates a process 500 for providing audio playback from a guest user space to a host user space according to embodiments of this disclosure. For ease of explanation, the process 500 is described as being executed or otherwise used by the processor 140 of the device 100 in FIG. 1. However, the process 500 may be used by any suitable device(s) and in any suitable system.

At block 502, the processor executing an audio daemon or other control application receives a request for audio output from one or more container applications running in a guest user space. At block 504, the processor creates an IPC channel connected between the host user space and the container user space. In some embodiments, the IPC channel is created between the audio daemon executed by the processor in the guest user space and a host application executed by the processor in the host user space. In some embodiments, the IPC channel is created between an audio daemon executed by the processor in the host user space and another application executed by the processor in the guest user space. The processor, in some embodiments, creates the IPC channel when the container starts. In some embodiments, the processor creates the IPC channel on demand whenever a guest application tries to use or output audio, which can provide for increased power and resource efficiency. In some embodiments, the processor creates a separate audio daemon thread to process audio content, and another thread to process handles and messages over the IPC channel.

At block 506, the processor buffers at the audio daemon incoming audio data from the one or more container applications to the IPC channel created in block 504. In some embodiments, the processor stores the audio content from the incoming audio data in a memory buffer of a shared memory. In embodiments in which the daemon is executed by the processor in the host user space, the processor can buffer the audio data at another application executed in the guest user space. Upon buffering the audio data, the processor sends a message to the host side via the IPC channel signaling that audio content is available. At block 508, the processor via a host application executed in the host user space buffers audio data received over the IPC channel and/or content in the shared memory buffer into audio tracks for playback. In embodiments in which the audio daemon is executed in the host user space, the processor can buffer the audio data into tracks via the audio daemon in the host user space. At block 510, the processor plays back the audio through an audio output device, such as external speakers. At block 510, audio playback can be accomplished by accessing, using a host application or audio daemon executed in the host user space, audio device nodes of the host operating system in order to provide audio data to audio drivers of the operating system kernel, separate loadable audio driver components, or user-mode audio drivers.

At decision block 512, the processor determines whether there is additional incoming audio being received from the one or more container applications. If at decision block 512 the processor determines there is additional incoming audio, the process 500 moves to block 506 wherein the processor buffers the additional incoming audio to the IPC channel. If at decision block 512 the processor determines there is no additional incoming audio, the process 500 moves to block 514. In some embodiments, the processor can wait a predetermined amount of time for additional audio before determining that no additional audio is being received. At block 514, the processor terminates the IPC channel. In some embodiments, the IPC channel is not terminated until the container ceases execution. The process 500 ends at block 516.

Although FIG. 5 illustrates one example of a process 500 for providing audio playback from a guest user space to a host user space, various changes may be made to FIG. 5. For example, while shown as a series of steps, various steps in FIG. 5 may overlap, occur in parallel, occur in a different order, or occur any number of times.

Figure 6:
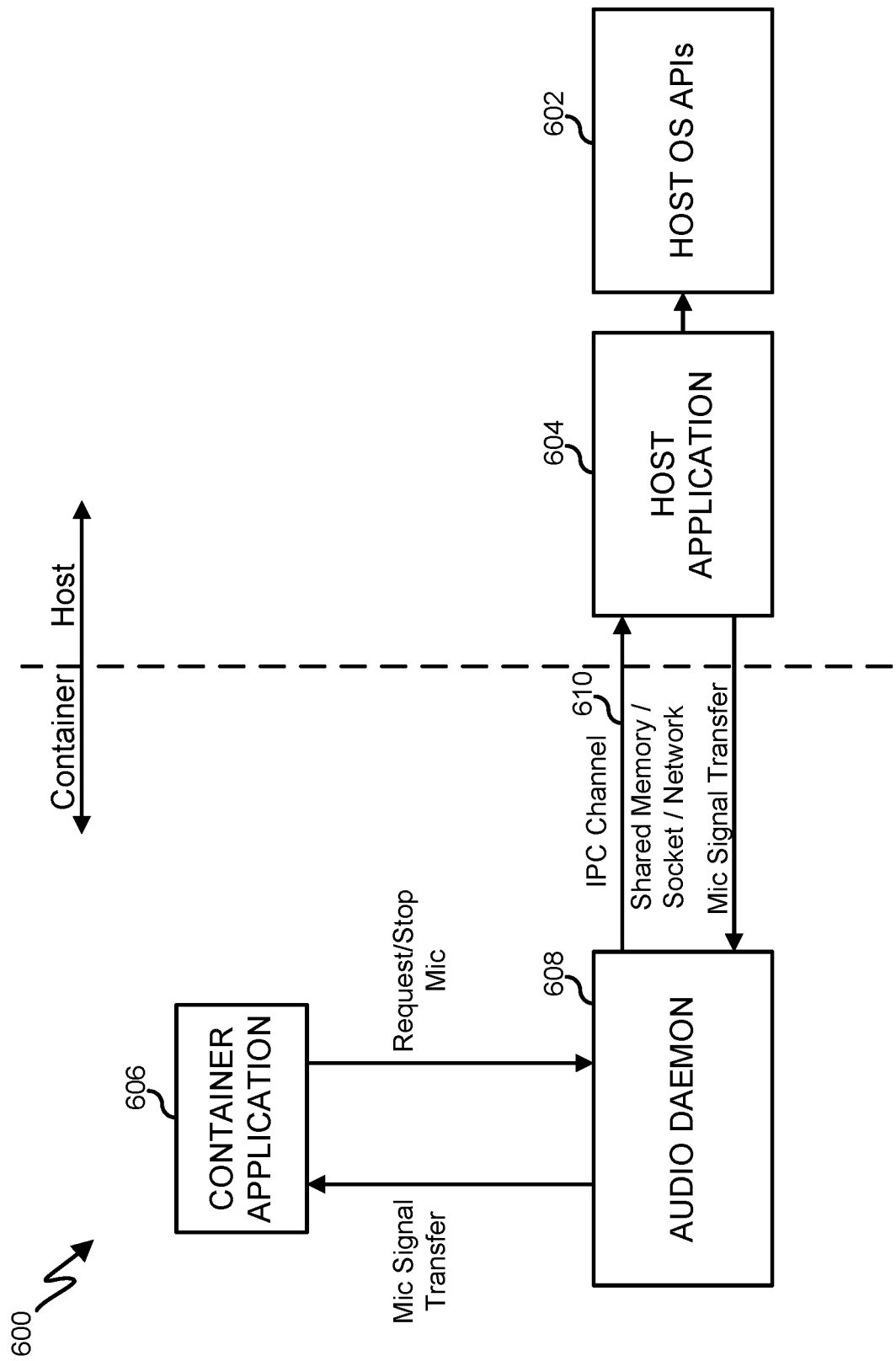
FIG. 6 illustrates an example operating environment for providing audio input from a host user space to a container according to embodiments of this disclosure.

FIG. 6 illustrates an example operating environment 600 for providing audio input from a host user space to a container according to embodiments of this disclosure. The environment 600 and the components of the environment 600 can be executed on a device, such as device 100, and/or by a processor, such as processor 140. The environment 600 includes a container user space or name space and a host user space or name space. The host user space includes a host operating system including a kernel for managing input of audio through one or more audio input devices. A host application 604 in the host user space executes and manages the container, and uses host operating system APIs 602 to provide data to the host operating system, such as requests for access to audio input devices. The host operating system and the container or guest operating system can be various operating systems, such as various distributions of Linux OS, ANDROID OS, WINDOWS OS, or other operating systems. A kernel for managing the operating systems of the host operating system and the container operating system can be a Linux kernel, or another type of operating system kernel. The environment 600 can be used in the context of a single instance of the kernel and multiple instance of user spaces, and is not bound to a specific kernel or specific host or guest system. In some embodiments, there can be multiple containers executed concurrently. The environment 600 can be applied to a broad spectrum of computing systems.

The container user space includes at least one container application 606. As illustrated in FIG. 6, the container user space also includes an audio daemon 608. The audio daemon 608 is an asynchronous dedicated process or thread inside the container that receives requests for audio input device access from the container application 606, communicates with the host application 604, and collects audio input data received from the host system. The audio daemon 608 creates an IPC channel 610 to transfer audio input requests to the host application 604, and to receive audio input from the host system over the IPC channel 610 at the audio daemon 608. The IPC channel 610 can be secured by kernel security protocols such as SELinux, SEAndroid, or other protocols. The IPC channel 610 can be secured by both DAC and MAC to prevent unauthorized access to the IPC channel 610 by other entities such as the container application 606. The audio daemon 608 is given special permissions to access the secured IPC channel 610.

The audio daemon 608 further establishes a socket, such as a local socket or a network socket, and a shared memory buffer between the audio daemon 608 and the host application 604 in the host user space. The audio daemon 608 receives a request for audio input from the container application 606, and sends a request for access to an audio input device over the IPC channel 610 to the host application 604. The host application 604 sends an acknowledgement of the request over the IPC channel 610 to the audio daemon 608. The host application 604 requests audio input device access from the host operating system using the host operating system APIs 602, and buffers incoming audio input into the IPC channel 610. Buffering of the audio input into the IPC channel 610, in some embodiments, includes buffering audio content into the shared memory buffer, and transferring handles and messages indicating how to use the audio content over the IPC channel 610 via the socket. For example, the handles and messages can include data such as audio configuration settings, such as sampling rate, audio format, information for particular client applications, or other settings. In some embodiments, the IPC channel 610 can be implemented without shared memory. In some embodiments, all audio data can be implemented with shared memory, without using a socket. In embodiments that do not use a socket, separate shared memory buffers can be used, at least one to buffer audio data, and at least another to buffer control communications such as handles and messages that indicate how to retrieve and use the audio content to the guest user space.

The audio daemon 608, in response to the handles and messages sent over the IPC channel 610 from the host application 604, retrieves incoming audio content such as microphone signals stored in the shared memory and provides the audio content to the container application 606. When audio input device access is no longer requested by the container application 606, the container application 606 can send a message to stop audio input to the audio daemon 608. Based on the messages to stop audio input, the audio daemon 608 sends a message to stop audio input over the IPC channel to the host application 604, which terminates the audio input from the audio input device.

In some embodiments, the host application 604 can have extra permissions assigned to the host application 604 that allow the host application 604 to read socket data and/or write to shared memory. The extra permissions can be initially configured as part of the host application 604, or can be granted to the host application 604, such as by a user indicating that access to device resources, such as audio input devices, is allowed. The host application 604 can then access device nodes or other components of the host operating system to request and receive audio input through at least one audio input device connected to a device running the environment 600. Providing the audio content through the shared memory buffer provides for efficient use of computing resources and power consumption. The secured IPC channel 610 also provides for enhanced security, as host applications in the host user space, such as host application 604, access the device nodes of the host operating system, while container applications merely request audio input and receive audio input from the audio daemon 608 without being able to access the device nodes of the host operating system.

Although FIG. 6 illustrates one example of an environment 600 for providing audio output from a container to a host operating system according to embodiments of this disclosure, various changes may be made to the example of FIG. 6. For example, the environment 600 could include any number of components in any suitable arrangement. In general, operating environments come in a wide variety of configurations, and FIG. 6 does not limit the scope of this disclosure to any particular configuration. While FIG. 6 illustrates one operational environment in which various features disclosed in this patent document can be used, these features could be used in any other suitable system.

For example, the IPC channel 610 can include a local socket, a network socket and/or shared memory. The IPC channel 610, in some embodiments, can be created when a container starts. In some embodiments, the IPC channel 610 can be created on demand whenever a guest application tries to use or output audio, which can provide for increased power efficiency and resource efficiency. In some embodiments, the IPC channel 610 is connected and runs after creation so long as the container continues running. In some embodiments, the IPC channel 610 is terminated when no audio is available or is being output from the container applications 606, which can provide for increased power efficiency and resource efficiency. In some embodiments, the IPC channel 610 is controlled by an application on both the host and the guest user spaces, such as if audio data is being passed out of and into the container, such as when an application in the container is both outputting audio data and receiving audio input data from a microphone. In some embodiments, the host application 604 operates at a decreased functionality and waits for an audio channel to be created to save power and computational resources. In some embodiments, the audio daemon 608 creates a separate thread to process audio content, and another thread to process handles and messages over the IPC channel 610.

Figure 7:
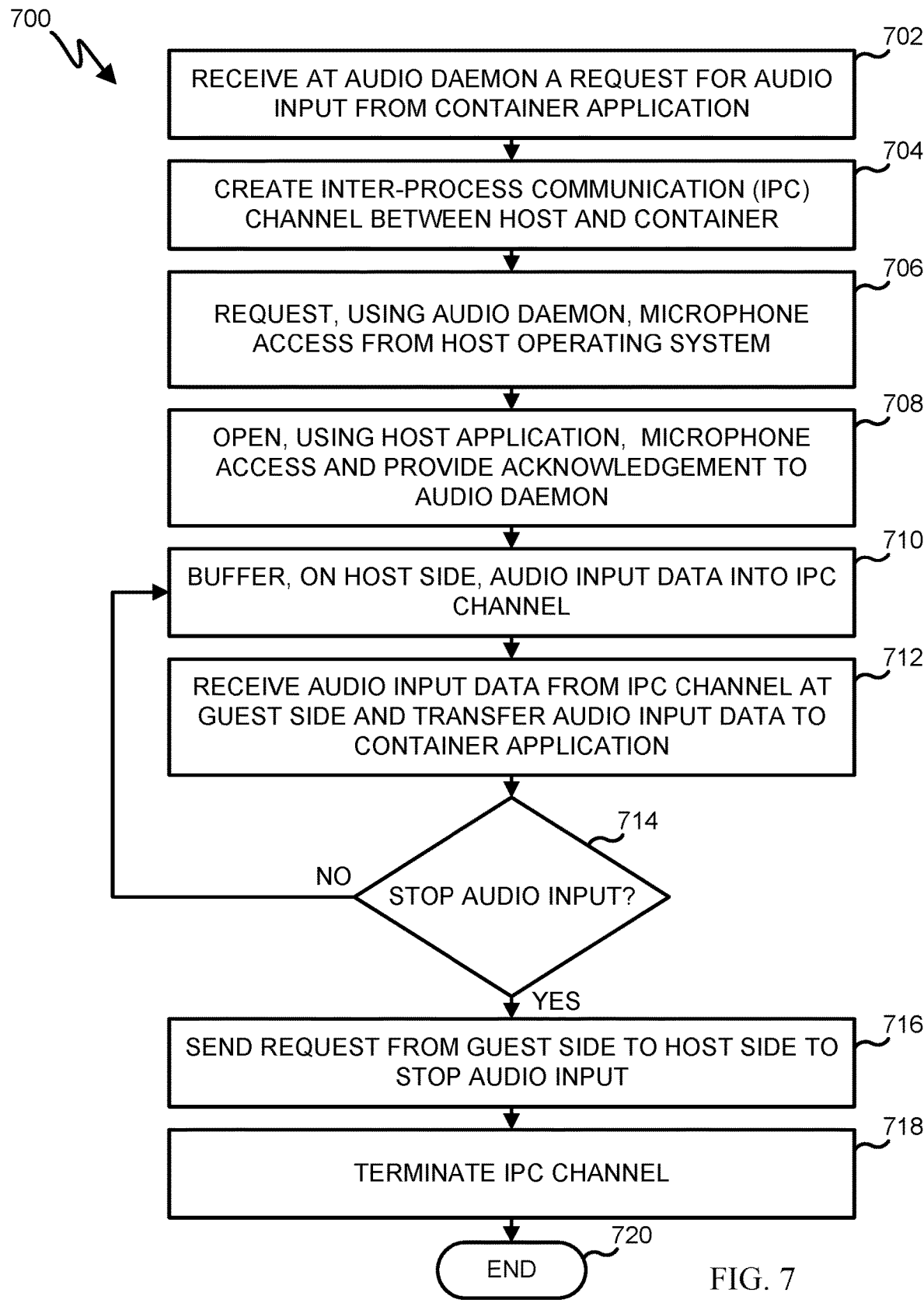
FIG. 7 illustrates a process for providing audio input from a host user space to a guest user space according to embodiments of this disclosure.

FIG. 7 illustrates a process 700 for providing audio input from a host user space to a guest user space according to embodiments of this disclosure. For ease of explanation, the process 700 is described as being executed or otherwise used by the processor 140 of the device 100 in FIG. 1. However, the process 700 may be used by any suitable device(s) and in any suitable system.

At block 702, the processor executing an audio daemon or other control application receives a request for audio input from at least one container application running in a guest user space. At block 704, the processor creates an IPC channel connected between the host user space and the container user space. In some embodiments, the IPC channel is created between the audio daemon executed by the processor in the guest user space and a host application executed by the processor in the host user space. In some embodiments, the IPC channel is created between an audio daemon executed by the processor in the host user space and another application executed by the processor in the guest user space. The processor, in some embodiments, creates the IPC channel when the container starts. In some embodiments, the processor creates the IPC channel on demand whenever a guest application requests audio input, which can provide for increased power and resource efficiency. In some embodiments, the processor creates a separate audio daemon thread to process audio content, and another thread to process handles and messages over the IPC channel.

At block 706, the processor sends a request over the IPC channel for audio input device access, such as access to a microphone, from the host operating system. In some embodiments, the processor sends the request via the audio daemon executed in the guest user space. In embodiments in which the audio daemon is executed in the host user space, the processor can send the request for an audio input device via another application executed by the processor in the guest user space. At block 708, the processor opens, via a host application or audio daemon executed by the processor in the host user space, audio input device access through the host operating system, and provides an acknowledgement over the IPC channel to the audio daemon or other application running in the guest user space. At block 710, the processor buffers at the host application or audio daemon executed in the host user space incoming audio input data provided by the audio input device to the IPC channel. In some embodiments, the processor stores the audio content from the incoming audio data in a memory buffer of a shared memory. Upon buffering the audio data, the processor can send a message to the guest side via the IPC channel signaling that audio input content is available.

At block 712, the processor via an audio daemon or other application executed in the guest user space receives the audio input data over the IPC channel and/or content in the shared memory buffer. The processor transfers the audio input data to the container application for use by the container application in accordance with the functions of the container application. At decision block 714, the processor determines whether a request to stop audio input is received. The request to stop audio input can be received from a container application, such as if a retainer application no longer is using audio input, or can be received from the host operating system if for some reason the host operating system needs to deny access to the audio input device, such as if another host application, such as a telephone call application, requests exclusive use of the audio input device. If at decision block 714 the processor does not receive a request to stop audio input, the process 700 moves to block 710 wherein the processor buffers additional incoming audio input to the IPC channel. If at decision block 714 the processor receives a request to stop audio input, the process 700 moves to block 716. In some embodiments, the processor can wait a predetermined amount of time for additional audio input before determining that no additional audio input is being received, in which the process also moves to block 716. At block 716, the processor sends a request from the guest user space to the host user space to stop audio input, closing audio input device access for the host application connected to the IPC channel. At block 718, the processor terminates the IPC channel. In some embodiments, the IPC channel is not terminated until the container ceases execution. The process 700 ends at block 720.

Although FIG. 7 illustrates one example of a process 700 for providing audio input from a host user space to a guest user space, various changes may be made to FIG. 7. For example, while shown as a series of steps, various steps in FIG. 7 may overlap, occur in parallel, occur in a different order, or occur any number of times.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An electronic device, comprising:
    a memory; and
    at least one processor coupled to the memory, wherein the at least one processor is configured to:
        execute a daemon process in one of a host operating system or a container executing a guest operating system, wherein the daemon process is configured to manage data transfer between the container and the host operating system;
        create, via the daemon process, an inter-process communication (IPC) channel between the container and the host operating system;
        receive incoming audio data; and
        buffer the incoming audio data to the IPC channel.

2. The electronic device of claim 1, wherein the incoming audio data includes audio output data from one or more container applications executed in the container.

3. The electronic device of claim 2, further comprising an audio output device, and wherein the at least one processor is further configured to:
    buffer, in the host operating system, the audio output data from the IPC channel; and
    playback the audio output data through the audio output device.

4. The electronic device of claim 1, further comprising an audio input device, wherein the incoming audio data includes audio input data from the audio input device.

5. The electronic device of claim 4, wherein the at least one processor is further configured to:
    receive, in the container, the audio input data from the IPC channel; and
    transfer the audio input data to one or more container applications executed in the container.

6. The electronic device of claim 1, wherein the IPC channel includes at least one of a shared memory and a socket.

7. The electronic device of claim 1, wherein the at least one processor is further configured to:
   determine that no audio data is available; and
   terminate, via the daemon process, the IPC channel based on the determination that no audio data is available.

8. The electronic device of claim 1, wherein the at least one processor is further configured to:
   execute an application in one of the container or the host operating system,
   wherein the application is configured to communicate with the daemon process, and
   wherein the IPC channel is configured to transfer data between the container and the host operating system.

9. A method for device audio, comprising:
   executing a daemon process in one of a host operating system or a container executing a guest operating system wherein the daemon process manages data transfer between the container and the host operating system;
   creating, via the daemon process, an inter-process communication (IPC) channel between the container and the host operating system;
   receiving incoming audio data; and
   buffering the incoming audio data to the IPC channel.

10. The method of claim 9, wherein the incoming audio data includes audio output data from one or more container applications executed in the container.

11. The method of claim 10, further comprising:
    buffering, in the host operating system, the audio output data from the IPC channel; and
    performing playback of the audio output data through an audio output device.

12. The method of claim 9, wherein the incoming audio data includes audio input data from an audio input device.

13. The method of claim 12, further comprising:
    receiving, in the container, the audio input data from the IPC channel; and
    transferring the audio input data to one or more container applications executed in the container.

14. The method of claim 9, wherein the IPC channel includes at least one of a shared memory and a socket.

15. The method of claim 9, further comprising:
    determining that no audio data is available; and
    terminating, via the daemon process, the IPC channel based on the determination that no audio data is available.

16. The method of claim 9, further comprising:
    executing an application in one of the container or the host operating system,
    wherein the application communicates with the daemon process, and
    wherein the IPC channel transfers data between the container and the host operating system.

17. A non-transitory computer readable medium embodying a computer program for operating an electronic device including a memory and at least one processor, the computer program comprising computer readable instructions that, when executed by the at least one processor, cause the electronic device to:
    execute a daemon process in one of a host operating system or a container executing a guest operating system wherein the daemon process manages data transfer between the container and the host operating system;
    create, via the daemon process, an inter-process communication (IPC) channel between the container and the host operating system;
    receive incoming audio data; and
    buffer the incoming audio data to the IPC channel.

18. The non-transitory computer readable medium of claim 17, wherein the incoming audio data includes audio output data from one or more container applications executed in the container, and wherein the computer program further comprises computer readable instructions that, when executed by the at least one processor, cause the electronic device to provide information to:
    buffer, in the host operating system, the audio output data from the IPC channel; and
    playback the audio output data through an audio output device.

19. The non-transitory computer readable medium of claim 17, wherein the incoming audio data includes audio input data from an audio input device, and wherein the computer program further comprises computer readable instructions that, when executed by the at least one processor, cause the electronic device to provide information to:
    receive, in the container, the audio input data from the IPC channel; and
    transfer the audio input data to one or more container applications executed in the container.

20. The non-transitory computer readable medium of claim 17, wherein the IPC channel includes at least one of a shared memory and a socket.

* * * * *